US012264054B2

(12) United States Patent
Schüler et al.

(10) Patent No.: US 12,264,054 B2
(45) Date of Patent: Apr. 1, 2025

(54) BASE PLATE FOR AN AUTONOMOUSLY GUIDED INDUSTRIAL TRUCK

(71) Applicant: Jungheinrich Aktiengesellschaft, Hamburg (DE)

(72) Inventors: Michael Schüler, Wakendorf (DE); Helmut Lohmann, Gyhum (DE); Holger Brunckhorst, Norderstedt (DE); Marcel Krenzin, Bad Bramstedt (DE)

(73) Assignee: Jungheinrich Aktiengesellschaft, Hamburg (DE)

( * ) Notice: Subject to any disclaimer, the term of this patent is extended or adjusted under 35 U.S.C. 154(b) by 323 days.

(21) Appl. No.: 17/819,372

(22) Filed: Aug. 12, 2022

(65) Prior Publication Data

US 2023/0050260 A1 Feb. 16, 2023

(30) Foreign Application Priority Data

Aug. 16, 2021 (DE) .................... 10 2021 121 217.0

(51) Int. Cl.
*B66F 9/12* (2006.01)
*B66F 9/06* (2006.01)

(52) U.S. Cl.
CPC ................ *B66F 9/12* (2013.01); *B66F 9/063* (2013.01)

(58) Field of Classification Search
CPC .................................. B66F 9/12; B66F 9/063
USPC ....................................................... 280/43.12
See application file for complete search history.

(56) References Cited

U.S. PATENT DOCUMENTS

| | | | | |
|---|---|---|---|---|
| 2,469,812 A * | 5/1949 | Breslav | B66F 9/18 414/621 |
| 8,517,342 B2 * | 8/2013 | Dunca | B66F 15/00 414/10 |
| 10,150,521 B2 * | 12/2018 | Lohmann | B66F 9/0759 |
| 2006/0255622 A1 * | 11/2006 | Manci | B66F 9/0759 296/190.01 |

(Continued)

FOREIGN PATENT DOCUMENTS

| | | |
|---|---|---|
| CN | 206606990 U | 11/2017 |
| CN | 108946586 A | 12/2018 |

(Continued)

OTHER PUBLICATIONS

German Application No. DE102021121217.0 , "Search Report", Jun. 24, 2022, 4 pages.

(Continued)

*Primary Examiner* — Hau V Phan
(74) *Attorney, Agent, or Firm* — Kilpatrick Townsend & Stockton LLP

(57) ABSTRACT

A base plate for an autonomously guided industrial truck having a longitudinal direction and a width direction, the base plate being provided to form a base plate arrangement and to downward delimit a vehicle body of the industrial truck in sections. The base plate comprises a plate body to define, at least in sections, an outline of the base plate arrangement. The base plate comprises an opening central in relation to the width direction and provided for accommodating a drive wheel of the industrial truck. The base plate comprises at least one recess offset in the width direction in relation to a longitudinal center axis for accommodating a support wheel arrangement of the industrial truck.

21 Claims, 3 Drawing Sheets

(56) References Cited

U.S. PATENT DOCUMENTS

Figure 1A:
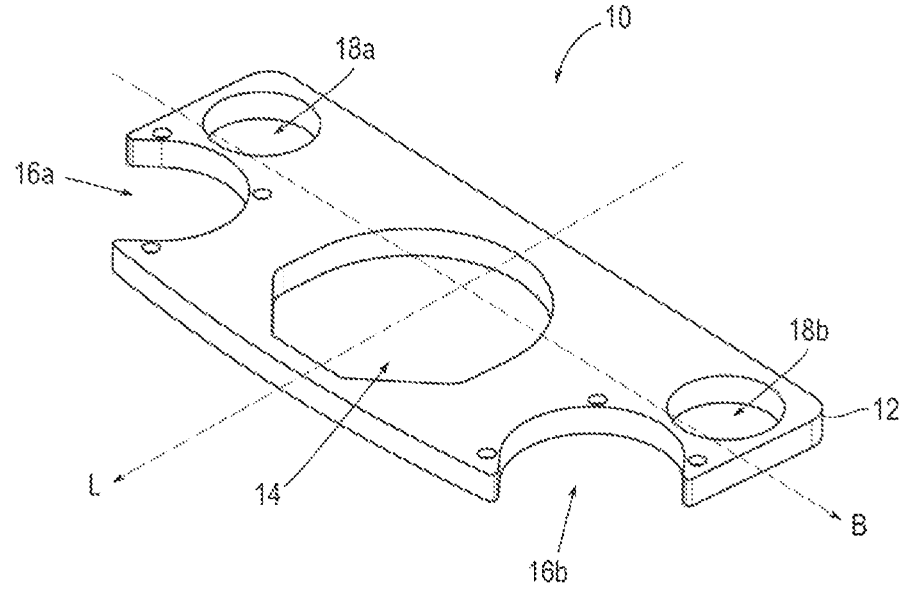

| | | | | |
|---|---|---|---|---|
| 2011/0260502 | A1* | 10/2011 | Yahner | B66F 9/0759 296/190.07 |
| 2016/0214840 | A1* | 7/2016 | Schüler | B66F 9/0754 |
| 2016/0244109 | A1* | 8/2016 | Lohmann | B66F 9/0759 |
| 2019/0225467 | A1* | 7/2019 | Lemke | B62D 21/186 |
| 2019/0225469 | A1* | 7/2019 | Lemke | B66F 9/0759 |

FOREIGN PATENT DOCUMENTS

| | | | |
|---|---|---|---|
| CN | 111717844 | A | 9/2020 |
| DE | 10022400 | A1 | 10/2001 |
| DE | 102010012749 | A1 | 9/2011 |
| DE | 212014000129 | U1 | 2/2016 |
| DE | 202019103019 | U1 | 10/2019 |
| DE | 202018104885 | U1 | 11/2019 |
| DE | 102020006337 | A1 | 4/2021 |
| EP | 0670256 | A1 | 9/1995 |

OTHER PUBLICATIONS

European Application No. 22188530.4, Extended European Search Report mailed Jan. 19, 2023, 7 pages.

* cited by examiner

BASE PLATE FOR AN AUTONOMOUSLY GUIDED INDUSTRIAL TRUCK

CROSS REFERENCE TO RELATED APPLICATION

This application claims priority to German Patent Application No. 10 2021 121 217.0, filed in Germany on Aug. 16, 2021, the entire contents of which are hereby incorporated herein by this reference.

The present invention relates to a base plate for an autonomously guided industrial truck with a longitudinal and a width direction, which is provided for forming a base plate arrangement and for downward delimiting a vehicle body of the industrial truck in sections, and which comprises a plate body which is provided for defining an outline of the base plate arrangement at least in sections.

It is known from the prior art to use, in industrial trucks and in particular low-lift industrial trucks, a sheet metal construction as a vehicle frame on which various components of the vehicle are arranged, for example drive and support rollers. Here, the various components of the vehicle are fastened at different locations and on different parts of this sheet-metal frame construction.

However, in particular in the case of autonomously guided industrial trucks (also referred to as AGVs or automated guided vehicles), some new challenges now arise which are to be countered by the present invention. On the one hand, it is usually necessary to mount or integrate a steerable drive roller and lateral support rollers on the underside of the vehicle body of such vehicles, which contribute to safe standing and stable travel of the industrial truck even in a loaded state. In this context, it is also desirable to keep the center of gravity of the industrial truck as low as possible in order to increase, for example, stability in the case of cornering in the loaded state of the industrial truck, which stability in recent times suffers to a certain extent from the increasingly used lithium ion batteries having a lower mass than previous battery generations and thus reducing the weight of the industrial truck. Although this is initially to be regarded as positive as regards the efficiency and handling of the industrial truck, the problem does arise that, on the other hand, enough weight must now be provided in another way to ensure a wheel pressure on a drive axle, which is required to generate a desired traction, both in a loaded and an unloaded state of the vehicle, to which a base plate which is as massive as possible and installed as low as possible can contribute.

Another important aspect in the design of such autonomously guided industrial trucks is the arrangement of scanner units, which are required and used in particular for personnel protection and navigation of the industrial truck. In this case, on the one hand, it must be ensured that the largest possible area around the industrial truck can be covered with the smallest possible number of scanner units, while it is also on the other hand desirable to arrange the corresponding scanner units at a relatively low height above the driving surface in order to be able to ensure that no obstacles below the scanning plane monitored by the scanner units are missed. Especially when handling pallets, for example in logistics facilities with block storage, a lowering of the scanner level to a few centimeters above the driving surface is therefore desirable. For the reasons mentioned above, the base plates previously used as underbodies of industrial trucks thus do not appear to represent an optimal solution for a new generation of autonomously guided industrial trucks, and there is the potential for improvement or optimization under the aspects just mentioned.

In order to achieve the above-mentioned object or to eliminate the disadvantages of the prior art discussed above, it is proposed according to the invention that a base plate of the generic type for an autonomously guided industrial truck of the type mentioned at the outset should have an opening which is central in relation to the width direction and is provided for accommodating a drive wheel of the industrial truck, as well as at least one recess which is offset in relation to a longitudinal center axis in the width direction and is provided for accommodating a support wheel arrangement of the industrial truck.

As a result of not only a central opening in the base plate being provided in this way, which can accommodate a drive wheel of the industrial truck in such a way that it projects through the central opening and can in particular be pivoted within the opening for a steering of the industrial truck, while at least one support wheel arrangement can be accommodated in the at least one recess outside the longitudinal center axis, a base plate can be created, which on the one hand allows functional components of the industrial truck to be arranged at a low height above the driving surface, in particular the already mentioned scanner unit, while on the other hand, a massive downward termination of the vehicle body is provided, which not only protects all components of the industrial truck arranged there from impacts and damage, while on the other hand helping to keep the center of gravity of the industrial truck as low as possible. Although the base plate according to the invention can in fact be formed in one piece as a solid monolithic metal part, it should not be ruled out at this point for such a single-piece base plate also to be composed of several subunits in an inseparable manner, for example welded.

A base plate of this kind, which has a central opening for a drive wheel and at least one offset recess for a support wheel, wherein the latter is preferably also fastened to the base plate, thus makes it possible on the one hand to positively influence the position of the center of gravity of the industrial truck, and on the other hand means an optimization of the structure of the industrial truck with regard to the sensors arranged on the industrial truck.

Known support wheel constructions are attached either above the support wheel to a sheet metal frame construction or by means of a rocker arm which is generally arranged laterally on the frame.

Such arrangements, as disclosed for example in EP 0 670 256 A1 or DE 100 224 00 A1, project into the scanning plane of laser scanners generally used for monitoring the surroundings, which scanning plane must be located at a certain distance from the ground surface so that in the prior art, laser scanners had to be arranged outside the vehicle geometry and thus widened the industrial truck in an undesirable manner.

For reasons of optimal load distribution of the resulting industrial truck, it can also be advantageous if the base plate according to the invention comprises two recesses for a respective accommodation of a support wheel arrangement, which recesses are arranged symmetrically in relation to the longitudinal center axis.

In addition, the at least one recess can be provided on the base plate according to the invention in such a way that it defines a part of the outline of the plate body. This means that the respective support wheel arrangement in a state of accommodation on the plate body partly itself forms part of the outline of this assembly and thus represents a termination at an edge thereof. In this way, the largest possible track width of the support wheel arrangement can be achieved, whereby, in particular in embodiments with a symmetrically arranged pair of support wheel arrangements, a stable driving behavior can be achieved even at high cornering speeds of the industrial truck.

Here, it can be considered in particular that the at least one recess in a front—in relation to the longitudinal direction—and outer—in relation to the width direction—corner region of the plate body defines the outline thereof, so that the respective support wheel arrangement in its mounted state forms the corresponding corner of the base plate arrangement.

In addition, the base plate according to the invention can further have at least one further recess which is provided for accommodating in sections a scanner unit. While such scanner units must be arranged in an operating state of the operational industrial truck such that their scanning plane extends above the base plate, some types of scanner units available on the market have an increased overall height, which can make it desirable to embed them in part in the base plate in order to minimize the effective height above the base plate for the scanner unit.

In this case, it may be desirable if the at least one further recess for a scanner unit is located completely within the outline of the base plate, so that, in particular in the width direction, there will still be material of the plate body outside this, which can form a protection for the sensitive scanner unit against lateral impacts or other potential hazards.

With regard to the further recesses provided for the scanner units, it may also be desirable if these are arranged symmetrically in pairs in relation to the longitudinal center axis of the base plate according to the invention. In this way, symmetrical monitoring of the two sides of the industrial truck can be achieved, which enables a simplified handling of the corresponding data as compared to an asymmetrical arrangement of scanner units and can facilitate all-round monitoring.

In addition, the base plate according to the invention can have a contact surface in its region which is at the rear in relation to the longitudinal direction and central in relation to the width direction, which contact surface is provided to support a lifting cylinder of the industrial truck. The base plate according to the invention also offers an optimal interface point for the attachment of this lifting cylinder, since due to its design, it is readily able to absorb and support the corresponding forces.

In particular in the event that the industrial truck to be fitted with the base plate according to the invention is to be used in block warehouses in which individual pallets to be picked stand on the substrate before being picked up and transported by the industrial truck, it can be advantageous if the base plate has a maximum extension in the width direction of approximately 800 mm or less. These dimensions correspond precisely to the width of a Euro pallet, so that a smooth maneuverability of the corresponding industrial truck between Euro pallets parked next to one another on the driving surface is made possible. Of course, variants of the base plate according to the invention with larger dimensions for corresponding other application purposes are also conceivable.

Since not only the steering ability of the drive wheel of the industrial truck but also the support wheel arrangements normally used and some types of scanner units in each case require a circular symmetry for their installation, it can be advantageous in the base plate according to the invention if the central opening and/or at least one of the recesses and/or at least one of the further recesses is designed substantially circular. Here, of course, in embodiments in which the at least one recess defines a part of the outline of the plate body, this feature is to be understood such that the portion of the corresponding recess which adjoins the outline of the plate body forms a section of a circle, while the support wheel arrangement itself can define the circular shape over the remaining portion.

Furthermore, the present invention relates to a base plate arrangement for an autonomously guided industrial truck, comprising a base plate according to the invention of the type just described, and at least one support wheel arrangement accommodated in the recess or in one of the recesses. There are initially no restrictions as regards the manner in which the at least one support wheel arrangement is fastened, for example, it could be screwed in one piece onto, or otherwise detachably attached to, the base plate arrangement at corresponding interfaces.

Of course, the construction type and the outer dimensions of the corresponding support wheel arrangement are to be adapted to the respective recess, wherein the at least one support wheel arrangement and the base plate can also be designed to be substantially flush with one another on their upper sides or the base plate can extend upward beyond the at least one support wheel arrangement. As a result of such interaction of the embodiments of the base plate and support wheel arrangement, it can be ensured that the scanning plane of a scanner unit arranged above the base plate likewise lies completely above the at least one support wheel arrangement and is not impaired by the latter nor by the base plate itself.

Accordingly, the base plate arrangement according to the invention can further comprise at least one scanner unit which is arranged in such a way that its scanning plane lies above the base plate, wherein the at least one scanner unit is optionally accommodated in sections in the or in one of the further recesses. In this case too, care must be taken in the dimensioning of the at least one further recess or in the selection of the type of the at least one scanner unit to ensure that they are compatible with one another with regard to their dimensions.

As already mentioned above, the provision of the at least one further recess makes it possible on the one hand to achieve an optimal alignment of the corresponding scanner unit with respect to its height position, while on the other hand, the at least one scanner unit is protected by the base plate against objects below the scanning plane.

In addition, in the front region of the base plate arrangement according to the invention, two load arms for holding load wheels can be fixedly attached to the base plate arrangement according to the invention, in particular can be welded thereto, wherein the load arms may extend on both sides of the contact surface and can be arranged, for example, flush therewith. Accordingly, a force-conducting interface for the load arms can also be created at this point, so that from this point of view, the transmission of forces and torques in the industrial truck is possible in an operationally reliable manner.

According to a further aspect, the present invention relates to a vehicle body of an autonomously guided industrial truck, which comprises a base plate arrangement of the type just described as well as a vehicle frame arranged above the base plate, wherein an interface for connecting the base plate arrangement and the vehicle frame is placed in such a way that it is arranged outside the central opening but is at a distance from the outline of the base plate in the width direction. In this way, sufficient space is created in the area between this interface and the external outline of the base plate in the width direction in order to arrange the at least one scanner unit in this area and thus to enable an enlarged field of view of more than 180°.

Accordingly, in relation to the longitudinal center axis, the at least one recess and optionally the at least one further recess can be arranged outside the interface in the width direction.

Finally, the present invention relates to an autonomously guided industrial truck which comprises such a vehicle body. Accordingly, any other desired functional units of the industrial truck, for example control and communication units, further sensor units and energy stores which are required for the operation of the industrial truck, can be arranged within the vehicle frame of this vehicle body.

Figure 1B:
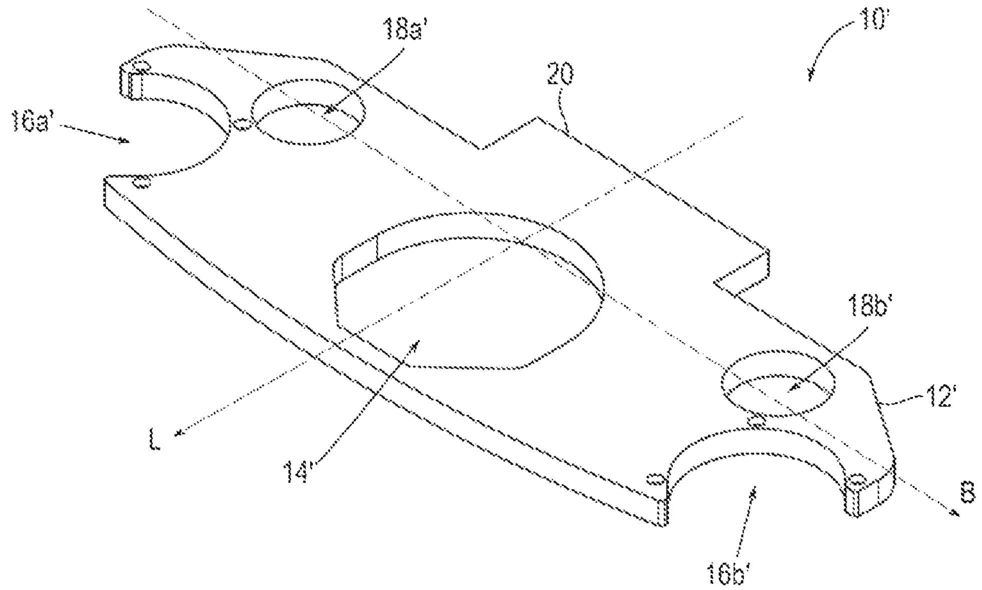
Figure 2A:
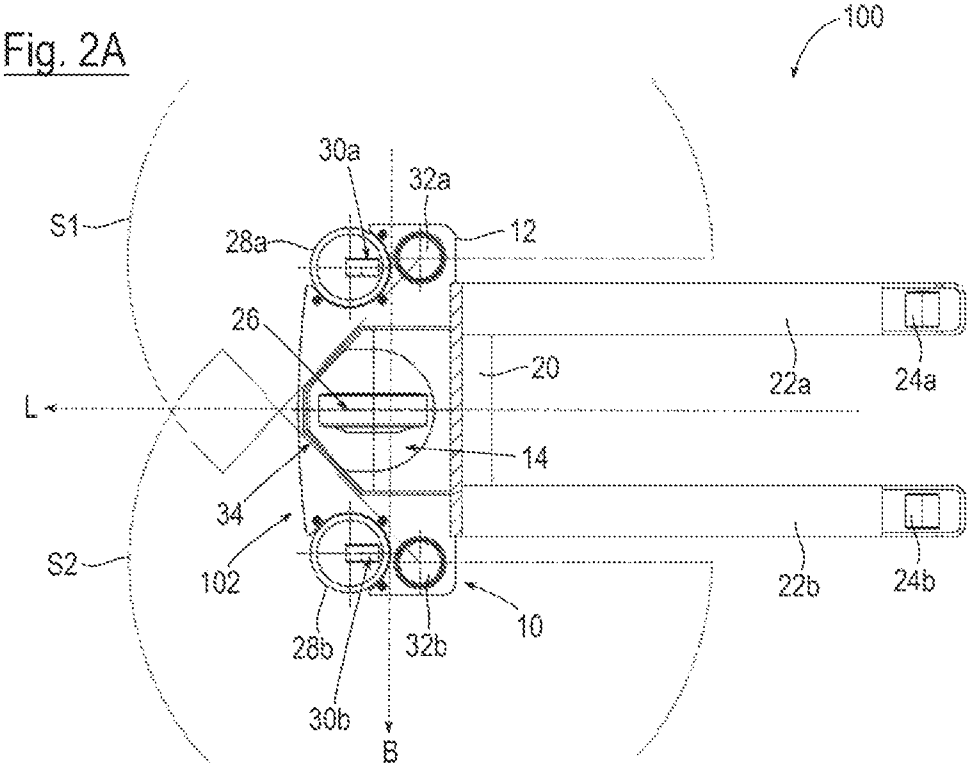
Figure 2B:
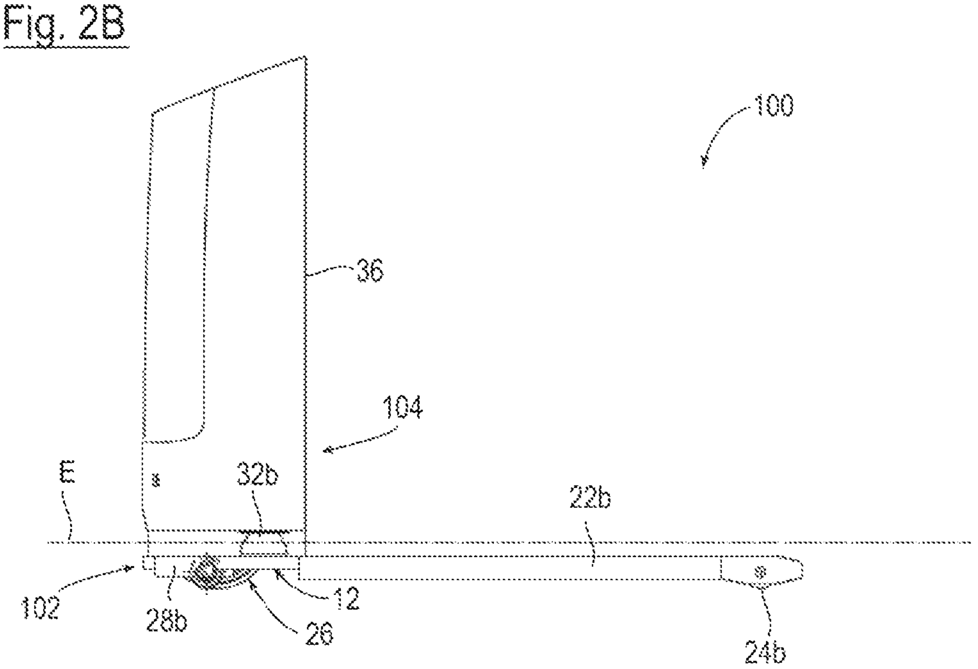
Figure 3:
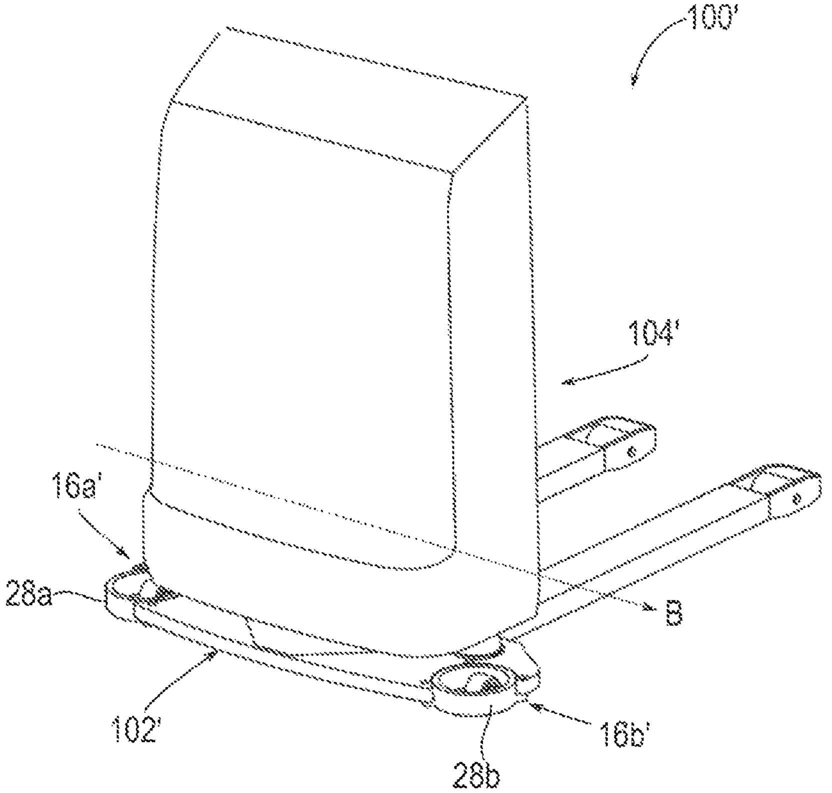

Further features and advantages of the present invention will become even clearer from the following description of embodiments, when viewed together with the accompanying figures. These show in detail:

FIGS. 1A and 1B, in each case in an isometric view, two variants of base plates according to the invention for autonomously guided industrial trucks;

FIGS. 2A and 2B, in a schematic representation, a plan view or side view of an industrial truck equipped with such a base plate; and FIG. 3, in an isometric rear view, a variant of the industrial truck from FIGS. 2A and 2B.

FIGS. 1A and 1B now show first of all two variants of base plates according to the invention for autonomously guided industrial trucks, which are denoted by the reference numerals 10 and 10'. It should be pointed out that identical or equivalent elements of the variant in FIG. 1B are each provided with the same reference numerals as the corresponding elements in FIG. 1A but are additionally provided with an apostrophe.

In this case, the base plates 10 and 10' each have a longitudinal direction or longitudinal center axis L and a width direction B perpendicular thereto, which are oriented in the same way as the corresponding directions usually designated in industrial trucks equipped with such base plates.

The base plates 10 and 10' are in each case provided to form a base plate arrangement of an industrial truck and to downward delimit a vehicle body of this industrial truck in sections. For this purpose, they each comprise a plate body 12 or 12', which can in particular be produced from a single solid metal part. The base plates 12 and 12' in turn each have a central opening 14 or 14' which is central in relation to the width direction B and is provided to accommodate a steered drive wheel of the industrial truck, which is not yet shown in FIGS. 1A and 1B, in such a way that the wheel extends both above and below the plane of the base plates 10 or 10'.

In addition, the two base plates 10 and 10' have recesses 16*a*, 16*b* or 16*a*', 16*b*' arranged offset in the width direction B in relation to the longitudinal center axis L, which recesses are arranged in the front outer corner region of the respective base plate 10 or 10' and define a part of the outline of the plate body 12 or 12'.

It is shown here that both the central opening 14, 14' and the recesses 16*a*, 16*b*, 16*a*' and 16*b*' are designed to be substantially circular, wherein in the case of the recesses 16*a*, 16*b*, 16*a*' and 16*b*', only the part thereof forming the outline is designed as a circular section. Finally, it should also be pointed out that the two base plates 10 and 10' each comprise a pair of further recesses 18*a*, 18*b* or 18*a*', 18*b*', which are likewise placed symmetrically in the width direction B and offset in relation to the longitudinal center axis L. In contrast to the recesses 16*a*, 16*b*, 16*a*', 16*b*', the further recesses 18*a*, 18*b*, 18*a*', 18*b*' are provided completely within the outline of the plate body 12 or 12', so that in the width direction B, in each case, material of the plate body 12 or 12' is still present outside the further recesses 18*a*, 18*b*, 18*a*', 18*b*' and acts as impact protection for the scanner units described further below.

With regard to the differences between the variants in FIGS. 1A and 1B, it should be pointed out on the one hand that in the variant in FIG. 1B, a contact surface 20 is provided behind the central opening 14' in the central region in the width direction B, which in the assembled state of the industrial truck can serve as a contact surface for a lifting cylinder for actuating a load carriage. Such a contact surface is not provided in the variant in FIG. 1A, so that it can be used, for example, in low-lift industrial trucks.

On the other hand, it can be seen in the variant in FIG. 1B that in the region of the recesses 16*a*', 16*b*', said contact surface is widened in the width direction B, so that the track width of the support wheel arrangements to be fitted at this point is maximized, which will be explained in more detail below with reference to FIGS. 2A, 2B and 3. As a result, the support wheel arrangements can, for example, be seated at least partially outside the remaining vehicle geometry, which can be advantageous, for example, in high-lift vehicles in order to increase their tilt stability, while however the particularly narrow external dimensions of the variant in FIG. 1A can no longer be maintained.

FIGS. 2A and 2B now show schematically a plan view and a side view of an autonomously guided industrial truck 100, in which a base plate similar to that in FIG. 1A is used and which is accordingly also denoted by the reference numeral 10. However, it should be pointed out here that this base plate 10 is likewise provided with a contact surface 20 in contrast to that in FIG. 1A. This contact surface 20 lies centrally and flush between two load arms 22*a* and 22*b* of the industrial truck 100, each carrying a load wheel 24*a* or 24*b* in the region of their ends remote from the base plate 10. It can also be seen that in the region of the central opening 14 in the base plate 10, a steered drive wheel 26 of the industrial truck 100 is accommodated, the hub of which extends above the base plate 10 so that the steered drive wheel 26 is partially below and partially above the plane of the base plate 10. Due to the substantially circular configuration of the central opening 14, the drive wheel 26 can also pivot about its vertical axis, which enables its steering capability.

In addition, two support wheel arrangements 28*a* and 28*b* can be seen accommodated in the recesses 16*a* and 16*b*, which are likewise substantially circular and are mounted in the recesses 16*a* and 16*b* in such a way that, in the front outer corner regions of the base plate arrangement, they themselves with their respective housings form a part of the outline of the base plate arrangement 102 formed in this way. In this case, the support wheel arrangements 28*a* and 28*b* are characterized in that their respective support wheels 30*a* and 30*b* are also pivotable about a vertical axis in order to make cornering possible, but the arrangements 28*a* and 28*b* have an extremely low overall height which essentially corresponds to the thickness of the plate body 12, as can be clearly seen in particular in FIG. 2B.

The support wheel arrangements 28*a* and 28*b* are thus aligned at their upper sides with the corresponding upper side of the plate body 12 and at this point enable the installation of two scanner units 32*a* and 32*b*, which are likewise symmetrically opposite each other in relation to the longitudinal center axis, in the further recesses 18*a* and 18*b*. As can be seen in FIG. 2B, these scanner units 32*a* and 32*b* have a scanning plane E with respective scan areas S1 and S2, which extends horizontally above the base plate 10 and the load arms 22*a* and 22*b*. Here, the walls of the plate body 12 protect the sides of the scanner units 32*a* and 32*b* against shocks occurring there, but said scanner units are arranged in a suitable position in order to be able to cover the largest possible angular ranges of the scanning plane E, as is to be understood based on the areas S1 and S2 indicated in FIG. 2A. However, in variants of the embodiment shown here, scanner units having a different geometry could also be used, which could make the provision of the further recesses 18*a* and 18*b* superfluous.

Finally, it should be noted that around the central opening 14, an interface 34 is provided for connecting the base plate 10 to the vehicle frame 36 for forming the vehicle body 104, in which the further components of the industrial truck 100 can be accommodated. The specific shape of this interface 34, which is placed in such a way that it is arranged outside the central opening 14 but in the width direction B at a distance from the outline of the base plate 10, and is further designed to be tapered forward, allows the advantageous positioning of the scanner units 32*a* and 32*b* already discussed above as well as the also discussed enlarged angle coverage of the scan areas S1 and S2.

While the aim in the variant shown in FIGS. 2A and 2B was to design the industrial truck 100 particularly narrow in the width direction B, for example with a width of at most 800 mm, while at the same time the scanner units 32*a* and 32*b* and the support wheel arrangements 28*a* and 28*b* are arranged as far as possible outside in the width direction, the base plate 10' in FIG. 1B with its widening in the region of the recesses 16*a'* and 16*b'* has been used in the further variant of an industrial truck 100' shown in an isometric rear view in FIG. 3A so that a slightly modified base plate arrangement 102' and correspondingly a modified vehicle body 104' results.

Here, the support wheel arrangements 28*a* and 28*b* are arranged partially outside the rest of the vehicle geometry and their distance in the width direction B has been maximized. This measure can be taken, for example, in high-lift vehicles in order to increase the tilt stability of these vehicles in applications in which the widening of the corresponding industrial truck 100' at this point is unproblematic. Otherwise, the industrial truck 100' can be designed identically to the industrial truck 100 in FIGS. 2A and 2B with regard to all further components, and a more detailed description is dispensed with here by reference to this figure.

The invention claimed is:

1. A base plate for an autonomously guided industrial truck having a longitudinal direction and a width direction, the base plate being provided to form a base plate arrangement and to downward delimit a vehicle body of the industrial truck in sections, the base plate comprising:
- a plate body to define, at least in sections, an outline of the base plate arrangement;
- an opening central in relation to the width direction and provided for accommodating a drive wheel of the industrial truck; and
- at least one recess defining a part of the outline of the plate body and offset in the width direction in relation to a longitudinal center axis, the at least one recess for accommodating a support wheel arrangement of the industrial truck.

2. The base plate of claim 1,
wherein the at least one recess comprises two recesses arranged symmetrically in relation to the longitudinal center axis.

3. The base plate of claim 1,
wherein the at least one recess defines the outline of the plate body in a front, in relation to the longitudinal direction, corner region and an outer, in relation to the width direction, corner region of the plate body.

4. The base plate of claim 1,
further comprising, in an area of the base plate that is at a rear in relation to the longitudinal direction and central in relation to the width direction, a contact surface to support a lifting cylinder of the industrial truck.

5. The base plate of claim 1,
wherein the base plate has a maximum extension in the width direction of about eight hundred millimeters (800 mm) or less.

6. A base plate arrangement for an autonomously guided industrial truck, comprising:
- a base plate, comprising:
  - a plate body to define, at least in sections, an outline of the base plate arrangement;
  - an opening central in relation to the width direction and provided for accommodating a drive wheel of the industrial truck; and
  - at least one recess defining a part of the outline of the plate body and offset in the width direction in relation to a longitudinal center axis and provided for accommodating a support wheel arrangement of the industrial truck; and
- at least one support wheel arrangement accommodated in the at least one recess or in one recess of the at least one recess.

7. The base plate arrangement of claim 6,
wherein (A) the at least one support wheel arrangement and the base plate are, on upper sides, substantially flush with one another, or (B) the base plate extends upward beyond the at least one support wheel arrangement.

8. The base plate arrangement of claim 6,
further comprising at least one scanner unit arranged such that a scanning plane of the at least one scanner unit lies above the base plate.

9. The base arrangement of claim 8, wherein the at least one scanner unit is accommodated in sections in the at least one recess or in the one recess of the at least one further recess.

10. The base plate arrangement of claim 6,
further comprising, in a front region of the base plate arrangement, two load arms for carrying load wheels fixedly attached to the base plate arrangement.

11. The base plate arrangement of claim 10, further comprising, in an area of the base plate that is at a rear in relation to the longitudinal direction and central in relation to the width direction, a contact surface to support a lifting cylinder of the industrial truck, wherein the load arms extend on both sides of the contact surface and are arranged flush therewith.

12. The base plate arrangement of claim 10, wherein the two load arms are welded to the base plate arrangement.

13. A vehicle of an autonomously guided industrial truck, comprising:
- a base plate arrangement, comprising:
  - a base plate, the base plate comprising:
    - a plate body to define, at least in sections, an outline of the base plate arrangement;
    - an opening central in relation to the width direction and provided for accommodating a drive wheel of the industrial truck; and at least one recess defining a part of the outline of the plate body and offset in the width direction in relation to a longitudinal center axis and provided for accommodating a support wheel arrangement of the industrial truck; and a vehicle frame arranged above the base plate; and an interface for connecting the base plate arrangement and the vehicle frame, the interface placed in such a way that the interface is arranged outside the central opening but in the width direction at a distance from the outline of the base plate.

14. The vehicle of claim 13, wherein, in relation to the longitudinal center axis, the at least one recess is arranged in the width direction outside the interface.

15. The vehicle of claim 14, wherein, in relation to the longitudinal center axis, the at least one further recess is arranged in the width direction outside the interface.

16. The vehicle of claim 13, wherein the vehicle comprises an autonomously guided industrial truck.

17. The vehicle of claim 13, wherein, in relation to the longitudinal center axis, the at least one further recess is arranged in the width direction outside the interface.

18. A base plate for an autonomously guided industrial truck having a longitudinal direction and a width direction, the base plate being provided to form a base plate arrangement and to downward delimit a vehicle body of the industrial truck in sections, the base plate comprising:

a plate body to define, at least in sections, an outline of the base plate arrangement;

an opening central in relation to the width direction and provided for accommodating a drive wheel of the industrial truck;

at least one recess offset in the width direction in relation to a longitudinal center axis, the at least one recess for accommodating a support wheel arrangement of the industrial truck; and at least one further recess provided to accommodate, in sections, a scanner unit.

19. The base plate of claim 18, wherein the at least one further recess lies completely within the outline of the base plate.

20. The base plate of claim 18, wherein the at least one further recess comprises at least two further recesses arranged symmetrically in relation to the longitudinal center axis.

21. The base plate of claim 18, wherein one or more of the central opening, at least one of the at least one recess, or at least one of the at least one further recess is substantially circular.

* * * * *